No. 868,956. PATENTED OCT. 22, 1907.
C. W. WILLETT.
GANG LATH BOLTER.
APPLICATION FILED MAY 29, 1907.

2 SHEETS—SHEET 1.

Witnesses.

Inventor.
Charles W. Willett.
by R. C. Wright.
Attorney.

No. 868,956. PATENTED OCT. 22, 1907.
C. W. WILLETT.
GANG LATH BOLTER.
APPLICATION FILED MAY 29, 1907.

2 SHEETS—SHEET 2.

Witnesses.

Inventor.
Charles W. Willett
by R. C. Wright.
Attorney.

UNITED STATES PATENT OFFICE.

CHARLES W. WILLETT, OF TACOMA, WASHINGTON, ASSIGNOR OF ONE-HALF TO SUMNER IRON WORKS, OF EVERETT, WASHINGTON, A CORPORATION.

GANG LATH-BOLTER.

No. 868,956.  Specification of Letters Patent.  Patented Oct. 22, 1907.

Application filed May 29, 1907. Serial No. 376,408.

*To all whom it may concern:*

Be it known that I, CHARLES W. WILLETT, a citizen of the United States, residing at Tacoma, in the county of Pierce and State of Washington, have invented certain new and useful Improvements in Gang Lath-Bolters, of which the following is a specification.

My invention relates to improvements in lath bolter mills and especially to the construction and arrangement of the feed mechanism of such machines.

The object of my invention is to provide means whereby the toothed wheels generally used in the feed mechanism may be eliminated and also to provide reversible upper presser rollers.

It is well known that the toothed wheels referred to continually clog with saw-dust and to such an extent as to cause them to break and require repairs or replacement of parts of the machine, thus making extra expense and loss of its use.

To overcome these difficulties I have provided a most simple, economical and practical feed mechanism which is capable of being operated indefinitely without clogging, breaking or getting out of order.

I attain these objects and other practical advantages, by the construction, combination and arrangement of parts illustrated in the accompanying drawings which form a part hereof and wherein,—

Figure 1:
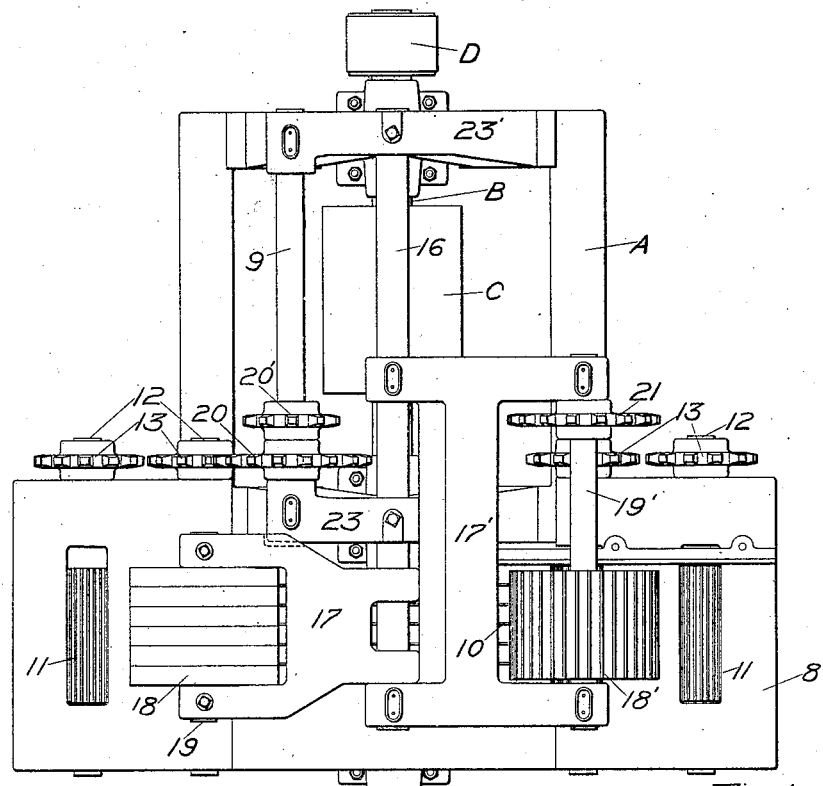
Figure 2:
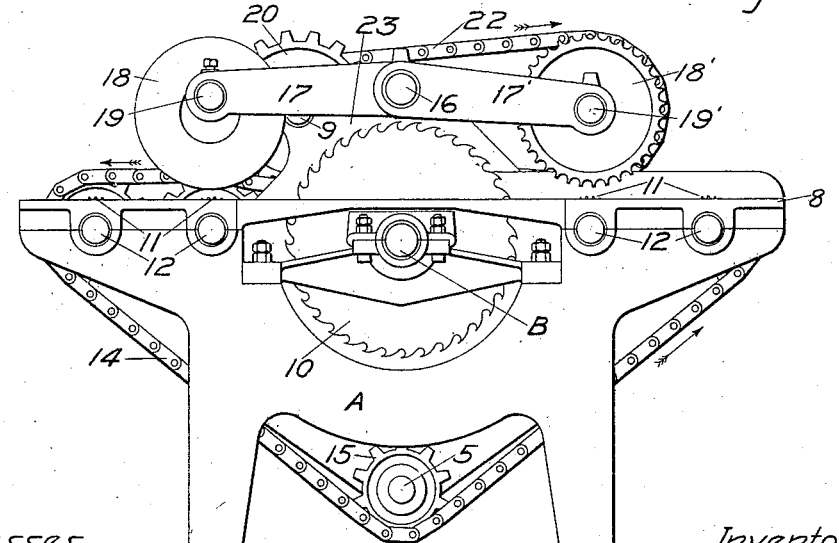
Figure 3:
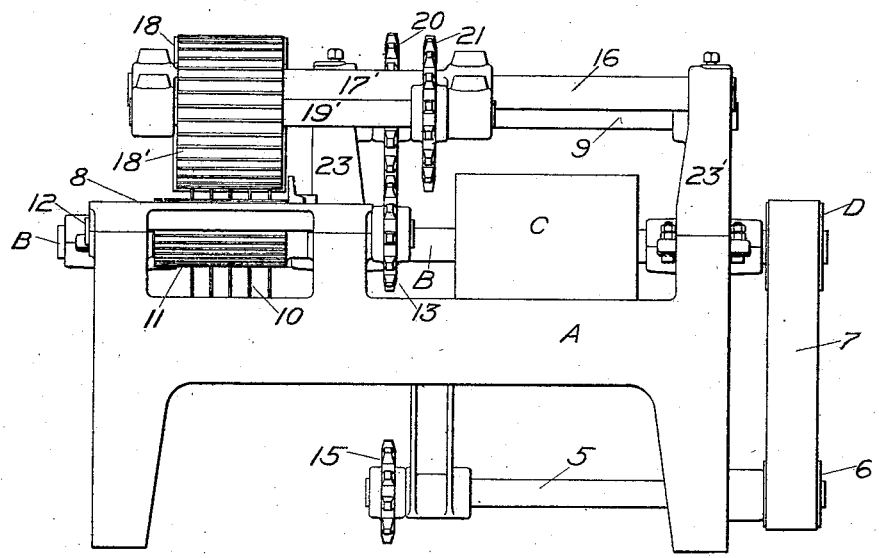
Figure 4:
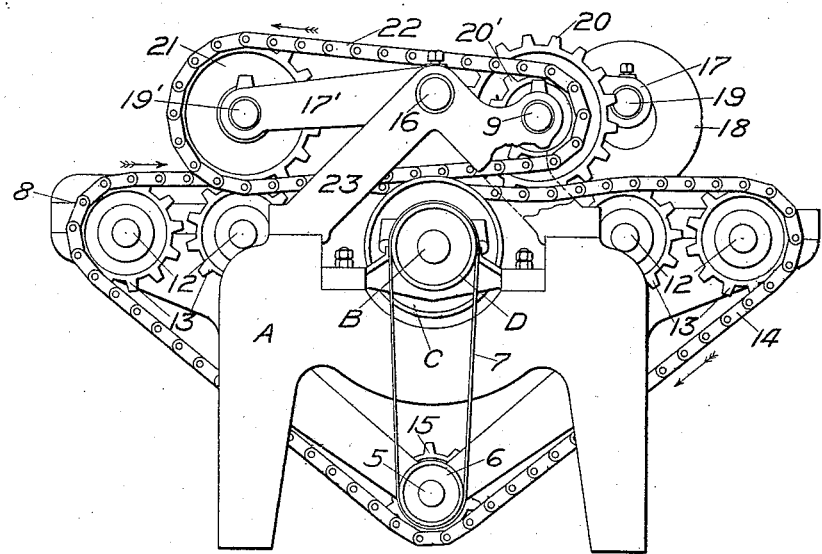

Figure 1 is a plan view of my lath bolter. Fig. 2 is a side elevation of the same. Fig. 3 is an end elevation of the machine. Fig. 4 is a side elevation thereof opposite to that shown in Fig. 2.

Like numerals and letters refer to like parts throughout the views.

A is the frame of the lath bolter.

B is the saw arbor mounted in the frame A. and having the pulley C fixedly mounted thereon, to which power is transmitted from some convenient source, generally below the floor on which the machine is placed.

D is a second pulley fixedly mounted on the end of the shaft B.

A countershaft 5 is mounted in a suitable position below the feed mechanism. At one end is fixedly mounted thereon a pulley 6 and power is transmitted to the same by the belt 7, Fig. 3. The sawing table 8 is placed at a suitable height on the frame A. The saw arbor B, below the table 8, is provided with a suitable number of saws 10. Lower feed rollers 11 are fixedly secured to shafts 12 mounted in the frame. The feed rollers and saws extend upwardly through openings in the saw table a suitable height in the usual manner. At the ends of the shafts 12 are fixedly mounted sprocket wheels 13. Rotary motion is transmitted to these sprocket wheels and the feed rollers by means of the link chain 14 extending to a sprocket wheel 15 on the countershaft 5 and over the sprocket wheels 13. Above the plane of the table 8, at a suitable height, is a shaft 16 mounted in two bridge trees 23—23' on opposite sides of the frame A. Loosely mounted on the shaft 16 are two oppositely disposed arms or members 17—17' which are formed with sufficient weight therein to give them the required pressure weight for the presser rollers 18—18'. At the respective outer sides of the members 17—17' are mounted shafts 19—19' and on these shafts are mounted the presser rollers 18—18'. A shaft 9 is mounted at a suitable height and position on the bridgetrees 23—23' and fixedly mounted thereon is a sprocket wheel 20 in the same vertical plane as the sprocket wheels 13, which sprocket 20 is adapted to engage the upper surface of the link chain 14. There is also fixedly mounted on the shaft 9 another sprocket wheel 20' at one side of the wheel 20 and in the same vertical plane with said wheel 20', a sprocket wheel 21 is fixedly mounted on the shaft 19'. The sprocket wheels 20' and 21 are connected by a link chain 22.

It will now be seen that when power is transmitted to the pulley C, arbor B and pulley D, the link chain 14 moves in the direction indicated by the arrows Figs. 2, 4 and engaging the sprocket wheels 13 rotates the feed rollers 11 in the same direction. At the same time the link chain 14 engages the sprocket wheel 20 of the presser roller mechanism and rotates it in the opposite direction to the movement of the sprockets 13, which causes the presser roller 18' to be rotated by means of the secondary link chain 22 in the same direction as the sprocket 20. Material being fed into the machine is carried forward by the series of lower feed rollers 11 and is held in position to be sawed by the presser rollers 18—18'. The presser roller 18' being driven by the secondary sprocket is of great advantage in forcing the material forward by the direct application of power to the upper surface thereof.

Having now described my device, I claim:

1. In a gang lath-bolter, the combination with a gang saw and lower feed mechanism having sprocket wheels and a link chain movable longitudinally with the sawing table, of presser roller mechanism comprising two oppositely disposed members 17—17' mounted on a shaft 16 which extends transversely to the table and has bearings at each end in bridge trees 23—23', the members 17—17' being provided with presser rollers 18—18' which are mounted on shafts 19—19', respectively, located at the outer sides of said members, a shaft 9 mounted in bearings on the bridge trees 23—23' at a suitable height and location, provided with a sprocket wheel 20, fixedly secured thereon in a position to be engaged by the upper surface of the lower feed roller link chain 14, a second sprocket wheel 20' fixedly secured on the shaft 9 near its end, a sprocket wheel 21, located in a vertical plane with the sprocket 20', fixedly secured upon the end of the shaft 19', and a link chain connecting said sprocket wheels 20' and 21, substantially as described.

2. In a gang lath-bolter, presser roller mechanism, comprising two oppositely disposed members 17—17' mounted on a shaft 16 which extends transversely to the table and has bearings at each end in bridge trees 23—23', the members 17—17' being provided with presser rollers 18—18' which are mounted on shafts 19—19', respectively, located at the outer sides of said members, a shaft 9 mounted in bearings on the bridge trees 23—23' at a suitable height and location, provided with a sprocket wheel 20, fixedly secured thereon in a position to be engaged by the upper surface of the lower feed roller link chain 14, a second sprocket wheel 20' fixedly secured on the shaft 9 near its end, a sprocket wheel 21, located in a vertical plane with the sprocket 20', fixedly secured upon the end of the shaft 19', and a link chain connecting said sprocket wheels 20' and 21, substantially as described.

3. A gang lath-bolter comprising a frame of suitable form and dimensions, a saw arbor therein provided with gang saws, lower feed roller mechanism, and means for transmitting power to the saw arbor, lower feed rollers and presser rollers, also presser roller mechanism comprising two oppositely disposed members 17—17' mounted on a shaft 16 which extends transversely to the table and has bearings at each end in bridge trees 23—23', the members 17—17' being provided with presser rollers 18—18' which are mounted on shafts 19—19', respectively, located at the outer sides of said members, a shaft 9 mounted in bearings on the bridge trees 23—23' at a suitable height and location, provided with a sprocket wheel 20, fixedly secured thereon in a position to be engaged by the upper surface of the lower feed roller link chain 14, a second sprocket wheel 20' fixedly secured on the shaft 9 near its end, a sprocket wheel 21, located in a vertical plane with the sprocket 20', fixedly secured upon the end of the shaft 19', and a link chain connecting said sprocket wheels 20' and 21, substantially as described.

CHARLES W. WILLETT.

Witnesses:
JULIAN CLAUGH.
WM. P. HOPPING.